United States Patent [19]

Spengler et al.

[11] 4,345,492

[45] Aug. 24, 1982

[54] METHOD OF MAKING METAL FORMING PUNCHES

[75] Inventors: Emerson D. Spengler; Charles W. Schaeffer, both of Lebanon, Pa.

[73] Assignee: Bethlehem Steel Corporation, Bethlehem, Pa.

[21] Appl. No.: 188,414

[22] Filed: Sep. 18, 1980

[51] Int. Cl.³ .............................................. B21K 5/00
[52] U.S. Cl. ................................................. 76/101 R
[58] Field of Search ................ 72/256, 273, 364, 462, 72/476, 479, 41, 42; 76/101 R, 101 B, 108 R, 108 T

[56] References Cited

U.S. PATENT DOCUMENTS

| 331,739 | 12/1885 | Stetson | 76/108 T |
|---|---|---|---|
| 2,921,865 | 1/1960 | Kubie | 72/42 X |
| 3,124,975 | 3/1964 | Lovisek | 76/101 R |
| 3,318,182 | 5/1967 | Carlson | 76/108 R X |

FOREIGN PATENT DOCUMENTS 1128370 8/1962 Fed. Rep. of Germany .... 76/101 R

Primary Examiner—Ervin M. Combs
Attorney, Agent, or Firm—Joseph J. O'Keefe; Michael J. Delaney

[57] ABSTRACT

An inexpensive method to make a punch for piercing or forming metal includes cutting a piece from a bar or rod, applying a phosphate and lubricant coating to the piece, extruding one end of the piece into a polygonal shape, annealing the piece, press or machine relieving the piece, machining the end of the piece having the polygonal shape and heat treating the piece to the proper hardness.

3 Claims, 5 Drawing Figures

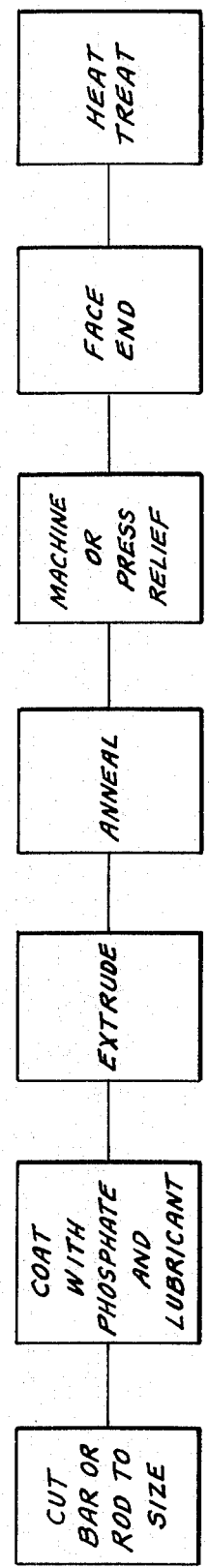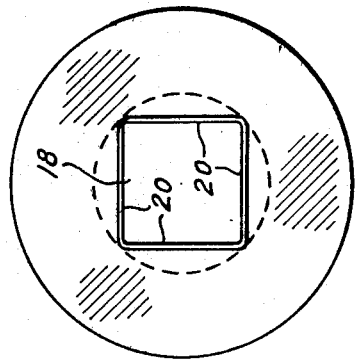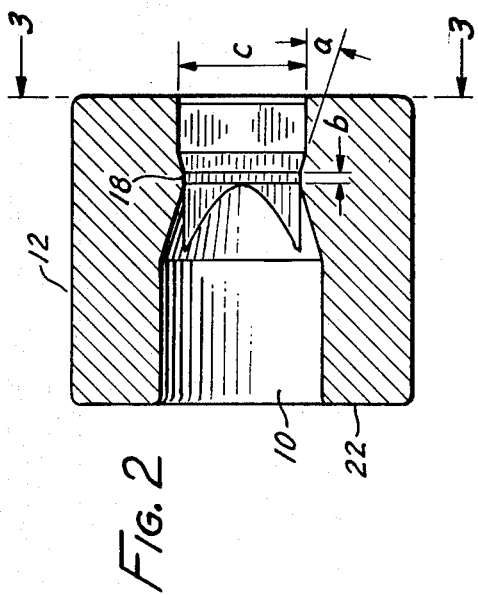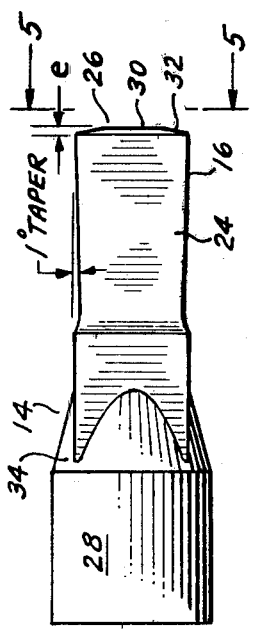

METHOD OF MAKING METAL FORMING PUNCHES

BACKGROUND OF THE INVENTION

Prior to this invention punches for piercing or forming metal articles were made by taking a bar or rod and machining a punch from the bar or rod. As a result of the large amount of metal removed during the machining operation, the material to produce a punch was costly. In addition, the required machining operations were expensive. Due to high material, manufacturing and attendant labor costs, punches made by the prior art methods have been expensive. Furthermore, if a punch failed to produce the expected number of piercing and forming operations the punch costs for such reduced operations were high.

SUMMARY OF THE INVENTION

This invention relates generally to a method of making punches for use in a piercing or forming operation and more specifically to a polygonal punch formed by an extrusion operation.

An object of this invention is to provide a method of making an inexpensive punch.

Another object of this invention is to produce a punch from the least amount of material.

Still another object of this invention is to produce an inexpensive punch which performs well during piercing or forming operations.

The above objects can be accomplished by a method which includes cutting a piece of stock from a bar or rod, applying a phosphate and lubricant coating to the piece, extruding one end of the piece into polygonal shape, annealing the piece, press or machine relieving the piece, machining the end of the piece having the polygonal shape and heat treating the piece to the proper hardness.

BRIEF DESCRIPTION OF THE DRAWINGS

FIG. 1 is a block diagram showing the various steps in the method of this invention.

FIG. 2 is a cross-sectional view showing an extrusion die used in the method of this invention.

FIG. 3 is a view taken along the lines 3—3 of FIG. 2.

FIG. 4 is a plan view of a punch made according to the method of this invention.

FIG. 5 is a view taken along the lines 5—5 of FIG. 4.

DETAILED DESCRIPTION OF THE INVENTION

Referring to FIG. 1 the method of this invention includes the following steps: cutting a piece from a bar or rod, coating the piece with a phosphate and lubricant, extruding the piece into a punch, annealing the punch, press or machine relieving the punch, facing the end of the punch and heat treating the punch.

Cut Bar or Rod to Size

A steel bar having the proper cross-sectional area and length is sawed or otherwise cut to the proper length. The cut length depends on the shape and length of the punch to be made. The steel bar is made of steel of a grade which produces the properties desired in the punch.

Coat with Phosphate and Lubricant

The piece, which was cut from the steel bar, is given a coating of phosphate and a lubricant to allow the piece to be extruded into a punch. The piece after being properly cleaned, pickled and rinsed is dipped in a solution which includes zinc phosphate. Thereafter a lubricant is applied over the phosphate coating. It has been found that the lubricant may be a solution of sodium stearate and a small amount of a free fatty acid.

Extrude

The cut piece of steel after receiving a phosphate and lubricant coating is positioned within portion 10 of the extrusion die 12 of FIG. 2. While the extrusion die 12 is such as to produce a punch 14 having a square end 16 as shown in FIG. 4, the extrusion die 12 could have an extrusion opening 18 which would have more or less than the four sides 20 which produce the square punch 14.

Once positioned within portion 10 of the extrusion die 12 a force is applied to the end of the cut piece to force the end of the cut piece through the extrusion opening 18 until the other end is about flush with the end 22 of extrusion die 12. Thereafter a force is applied to the other end of the cut piece to force the cut piece which is now in the approximate shape of a punch 14 out of the extrusion die 12.

Cold extrusion is an art wherein knowledge is constantly expanding. While any single rule cannot be construed as absolute it is known that low and medium carbon steels can be extruded with a 30% reduction in area by open extrusion and up to about 80% reduction in area by confined extrusion.

Anneal

After the punch 14 is extruded, it is annealed to relieve any stresses which are present and to reduce the hardness of the punch 14 resulting from the cold working which occurs during the extrusion step.

Press or Machine Relief

As shown in FIG. 4, punch 14 has a reduced cross-section or tapered portion 24. Tapered portion 24 extends a substantial distance from the square end 16 of the punch 14. When the punch 14 is used in a metal piercing or forming operation, portion 24 reduces the friction between the punch 14 and the metal being pierced or punched. Portion 24 may be machined into the punch 14 or may be pressed into the punch by the use of V-blocks.

Face End

After the extrusion step the polygonal cross section end 16 of the punch 14 will be irregular. This irregularity is removed and the face 26 of the punch is provided with a flat section 30 and a tapered section 32.

Heat Treat

Depending upon the material used to make the punch, the punch is heat treated to provide the physical properties desired in the punch.

Specific Example

The following steps were taken in accordance with this invention to make a square piercing punch having an overall length of 3-¼" for piercing a ¾" square hole.

(1) A 1.058" diameter bar of tool steel was provided. The steel had the following composition: 0.60 C., 1.85 Si, 0.70 Mn, 0.45 Mo, 0.20 V and remainder Fe. The bar was centerless ground. A piece of stock about 2-3/4" long was cut from this bar.

(2) The piece was cleaned, pickled, rinsed in water, dipped in a solution of zinc phosphate, rinsed in water, neutralized in an alkaline solution and dipped in a solution of sodium stearate and a free fatty acid.

(3) The piece was placed within portion 10 of die 12. Portion 10 had a diameter of about 1.061" and a length of about 0.875". The extrusion opening 18 of die 12 was about 0.766" square, angle a was about 15°, dimension b was about 0.078" and dimension c was about 0.771". The overall length of the die 12 was about 2" and the outside diameter was about 2-1/4".

The piece was then forced into the die 12 to provide a square cross section on one end of the piece. The piece was then forced in the opposite direction to remove the formed punch 14 from the die 12.

The punch 14 as shown in FIGS. 4 and 5 had a cylindrical portion 28 on one end, a square portion 16 on the other end and an intermediate transition portion 34. The cylindrical portion was about 1" long, the transition portion about 0.55" long and the square portion about 1-11/16" long prior to the facing step.

It was found that when using steel of the above composition a square can be extruded from a round having a diameter equal to the cross corners dimension of the square.

(4) The punch was heated to 1450° F. and furnace cooled to produce a maximum hardness of about 229 Brinell.

(5) A 1° taper was then machined into the punch as shown in FIG. 4. Alternatively, the taper could be pressed into the punch 14 by the use of V-blocks.

(6) About 1/4" was cut off the face 26 of the punch 14. The punch was then provided with a flat end 30 having a diameter d of about 3/8" and a tapered portion 32 having a depth e of about 1/32".

(7) The punch was then heated to about 1600° F. and held at that temperature for about 1/2 hour and then oil quenched. Following the quench the punch was double tempered-first at about 600° F. for about two hours and second at about 550° F. for about two hours.

In production, the punch performed better than prior art punches. In addition, the punch was made at a fraction of the cost of prior art punches.

While this invention has been described in considerable detail, one skilled in the art will realize that there are many alternatives which could be practiced within the scope of this invention. Thus, the inventors do not intend that their invention be limited to any specific embodiment but intend that their invention include alternatives and equivalents as fall within the spirit of their invention and as defined by the claims.

We claim:

1. A method of making a punch for forming metal comprises sequentially the following steps:
    (a) providing a cylindrical bar of steel,
    (b) cutting a piece from said cylindrical bar,
    (c) applying a coating of phosphate and lubricant to said piece,
    (d) extruding said piece into a punch for forming metal having a polygonal cross section at one end, a cylindrical cross section at the other end and an intermediate transition portion therebetween, the length of the cylindrical cross section being about the same as the length of the polygonal cross section,
    (e) annealing said punch
    (f) facing said one end of said punch, and
    (g) heat treating said punch.

2. The method of claim 1 wherein said polygonal cross section is a square.

3. The method of claims 1 or 2 wherein said punch is press relieved following step (e).

* * * * *